May 27, 1969

H. A. HAIR ET AL 3,447,143

RECIPROCAL FERRITE PHASE SHIFTERS AND MEMORY
SYSTEM UTILIZING SAME

Filed June 30, 1966

PHASE SHIFTER 32

INVENTORS
Hugh A. Hair
Gerard T. Roome
Carl W. Gerst
Edgar E. Des-Jardins
Edward J. Domick BY *Yeter & Spileras*

ATTORNEYS

United States Patent Office 3,447,143
Patented May 27, 1969

3,447,143
RECIPROCAL FERRITE PHASE SHIFTERS AND MEMORY SYSTEM UTILIZING SAME
Hugh A. Hair, Liverpool, Gerard T. Roome, Syracuse, Carl W. Gerst, North Syracuse, and Edgar E. DesJardins and Edward J. Domick, Syracuse, N.Y., assignors to Research Corporation, New York, N.Y., a corporation of New York
Filed June 30, 1966, Ser. No. 561,773
Int. Cl. G11b 5/14
U.S. Cl. 340—174
19 Claims

ABSTRACT OF THE DISCLOSURE

A microwave device includes a planar self-latching-ferrite element, a signal conductor and a planar ground-plane element in planar coparallel relationship. At least one control conductor is provided for changing the state of magnetization of the ferrite element. Some embodiments are directed to reciprocal phase-shifters; and other embodiments are directed to memory elements.

---

This invention pertains to microwave devices and more particularly to reciprocal phase-shifters and related devices incorporating phase-shifters.

A reciprocal phase-shifter is a device which introduces the same change in the phase of the signal passing through the device in either direction. It is one of the basic elements in many microwave systems. It is used extensively in microwave devices such as phased-array-antenna systems, polarimeters and multiplexers. In phased-array-antenna systems there have been proposals to incorporate hundreds and even thousands of phase-shifters to obtain the desired radiation patterns and lobe switching. Heretofore, the available phase-shifters were bulky devices which required considerable time to fabricate. Clearly, antenna systems which require a considerable number of phase-shifters are expensive and may be impractical for airborne equipment when presently available phase-shifters are employed. Another disadvantage of many presently available phase-shifters employing ferrites is that they require a biasing magnetic field. Such fields are either generated by permanent magnets, adding to the bulk and weight of the system, or more often by current-energized windings which add to the power consumption of the system.

In the past few years, there has been a trend to the miniaturization of components and to integrated circuitry. Phase-shifters using bulk-ferrite devices are out of place in such environments. It is impractical and expensive to devise a hybrid system including both integrated circuits having planar geometry and bulk-material devices having volumetric geometry. In fact, such systems may become impossible to assemble when microwaves in the millimeter range are to be processed.

It is, accordingly, a general object of one aspect of the invention to provide improved reciprocal microwave phase-shifters which are extremely small, light in weight and relatively inexpensive to mass produce.

It is another object of this aspect of the invention to provide reciprocal microwave phase-shifters which are completely passive and require no continuously operating external sources of electrical or magnetic energy to control the phase of microwave signals.

Briefly, this aspect of the invention contemplates a reciprocal microwave phase-shifting device of multiplanar construction which comprises at least one planar ground-plane element and a signal conductor disposed in a plane parallel to the ground-plane element. The signal conductor and the ground-plane element are spaced from each other in cooperating relation to provide a guided-microwave-energy path. There is a planar self-latching-ferrite element disposed in a plane parallel to the plane of the ground-plane element and near enough to the guided-microwave-energy path to electromagnetically cooperate therewith. A self-latching-ferrite element is one which remains in a state of remanent magnetization after the removal of a magnetizing field. The ferrite element electromagnetically cooperates with the guided-microwave-energy path when it is close enough to affect the permeability of the path. Switching means are included in the device to selectively switch the remanent magnetization of the ferrite element between substantially orthogonal directions in its plane. Microwave-energy-input means are disposed at one end of the signal conductor and the ground-plane element, and microwave-energy-output means is disposed at the other end of the signal conductor and the ground plane element. Microwave energy received at the input means will be transmitted from the output means, differentially phase-shifted, in accordance with the direction of the remanent magnetization in the ferrite element.

According to another aspect of the invention there is contemplated providing a memory system. In the data processing field there has been a continued demand for more compact and higher speed memories. Lately, there has been considered content-addressable or associative memories. Such memories have two requirements. They must be ultra high speed because the entire memory must be searched to find the desired items; and their contents must be nondestructively read out since the entire contents must be read out to locate the desired items. If the undesired items are destroyed during read-out the memory can only be scanned once.

In order to satisfy these requirements there have been proposed complex memory systems using parallel accesses to the memory registers and recirculating read-out and write-in techniques. There have even been proposed cryogenic memory systems. Not only are such systems bulky and expensive but also they cannot attain the speeds required for large-scale associative memories.

It is, accordingly, a general object of another aspect of the invention to provide an improved nondestructive-read-out microwave memory system.

It is another object of this aspect of the invention to provide an ultra-high-speed, nondestructive-read-out microwave memory system which is built from inexpensive memory cells.

According to this aspect of the invention there is contemplated at least one bit-storage element. The bit-storage element includes at least one planar ground-plane element and an interrogating-signal conductor disposed in a plane parallel to the ground-plane element. The ground-plane element and the interrogating-signal conductor are spaced from each other and cooperate to provide a guided-microwave-energy path. A planar self-latching-ferrite element is disposed in a plane parallel to the ground-plane element and is near enough to the guided-microwave-energy path to electromagnetically cooperate with the path. A self-latching-ferrite element is one which remains in a state of remanent magnetization after the removal of a magnetizing field. The ferrite element electromagnetically cooperates with the guided-microwave-energy path when it is close enough to affect the permeability of the path.

Bit-recording means are provided for controllably setting the remanent magnetization of the ferrite element in a first direction for recording a first bit-value and in a second direction for recording a second bit-value. A microwave interrogating-signal generating means is connected to one end of the interrogating-signal conductor and the ground-plane element for transmitting microwave interrogating signals along the guided-microwave-energy path. The microwave interrogating signal is differentially shifted between first and second phases in accordance with the direction of remanent magnetization in the ferrite element. Means connected to the other end of the interrogating-signal conductor and the ground-plane element indicate the value of the bit stored in the bit-storage element in accordance with the phase of the received microwave interrogating signal.

A feature of both aspects of the invention concerns the actual mechanical arrangement of the ground-plane element, the ferrite element and the conductors to provide a compact configuration that is highly suited to mass production.

Other objects, features and the advantages of the invention will be apparent from the following detailed description when read with accompanying drawings which show, by way of example and not limitation, apparatus for practicing the various aspects of the invention.

Figure 1:
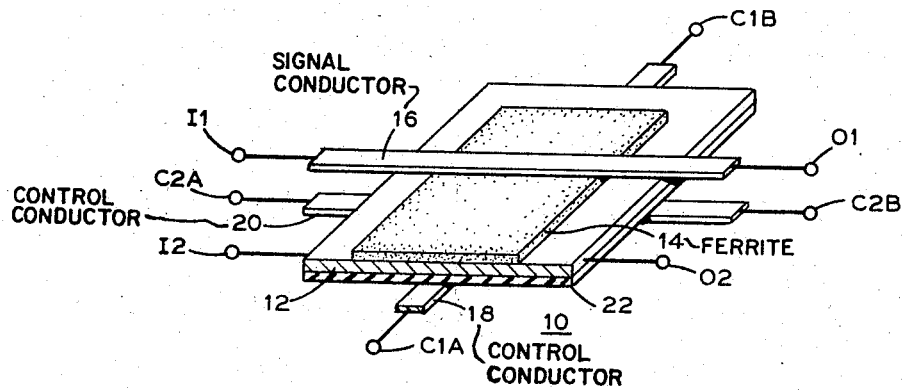
FIGURE 1 is a perspective view of one embodiment of a reciprocal-phase shifter for microwaves in accordance with the invention wherein a rectilinear signal conductor is employed with a ground-plane element and a ferrite element.

In a guided-microwave path the velocity of the flow of the microwave energy is a function of at least the permeability of the medium of the path. Therefore, changes in the medium permeability introduce changes in the velocity of energy flow. These changes in velocity can be equated to changes in the electrical length of the path. A change in the electrical path length is equivalent to a differential delay or phase-shift in the microwave signal propagated along the path. Hence, by knowing the available change of permeability in the path and then choosing a mechanical length of the path, any desired differential phase-shift can be obtained.

Changes in the permeability in the path are obtained by introducing a ferrite material in the path and then controlling the direction of magnetization of the ferrite material with respect to the direction of polarization of the RF (radio frequency)-magnetic field component of the microwave energy flowing down the path. For example, assume a microwave signal is transmitted along the Z-axis of an orthogonal coordinate system and the RF-magnetic field component thereof is linearly polarized and vibrating in a direction parallel to the Y-axis. Further, assume there is a ferrite medium in the path of propagation of the microwave energy. The ferrite medium is also assumed to be unsaturated but to be magnetized to a high degree of remanence so that the medium has a domain structure composed mainly of long thin domains, each of which is magnetized to saturation and oriented mainly in the direction of the net magnetization.

Since the RF-magnetic-field component interacts with each domain, it is possible to calculate the contribution of each domain to the effective permeability of the medium. Now it can be shown that if the ferrite medium is a planar element lying in the XZ-plane, any domain which lies parallel to the Y-axis does not interact with the RF-magnetic-field component since there is no net torque on the magnetic moments in the domain. The effective permeability of such a domain is therefore unity. Also if a domain lies parallel to the Z-axis the effective permeability is some value less than unity. Such a phenomenon occurs in ferrites having a resonance frequency much lower than the frequency of the microwave energy. A further discussion of this effect can be found in "Topics in Guided Wave Propagation Through Gyromagnetic Media," H. Suhl and L. R. Walker, Bell System Technical Journal, vol. 33, September 1954.

From the above discussion it should be apparent that if a domain direction can be switched by ninety degrees from the Z-axis direction to the Y-axis direction, a reciprocal differential permeability of the medium can be obtained. When the contributions of all domains are considered it can be shown that the differential phase-shift resulting from the differential permeability of the medium is proportional, at least, to the change in remanent magnetization between the Z-axis direction and the Y-axis direction in the ferrite medium.

It should be noted that the effect requires that there be a change in the remanent magnetization and the magnitude of the differential phase-shift is directly proportional to the magnitude of the change. Furthermore, in any practical device the ferrite medium must retain a considerable remanent magnetization so that it need not be continuously supplied magnetizing energy to keep it magnetized in a given direction. In other words, the ferrite medium must be self-latching. This condition is satisfied in a planar ferrite element when:

$$H_c \text{ is greater than } 4\pi M_s \left(\frac{t}{l}\right)$$

where $H_c$ = the coercivity of the ferrite material
$M_s$ = the saturation magnetization of the ferrite material
$t$ = the thickness of the ferrite element
$l$ = the length of the ferrite element Referring now to FIGURE 1 a microwave phase-shifting device 10 is shown comprising a planar ground-plane element 12, a planar self-latching-ferrite element 14, a signal conductor 16, nad control conductors 18 and 20. Signal conductor 16 is spaced from ground-plane element 12 to establish a guided-microwave-energy path which is known as a microstrip line. Microwave energy will propagate down the line in the TEM mode. It is also possible to have another ground-plane element spaced above signal conductor 16 to provide a shielded strip line. Ferrite element 14 is preferably disposed between ground-plane element 12 and signal conductor 16. However, it should be noted that it is possible to place element 14 above signal conductor 16. It is only necessary that the ferrite element be electromagnetically coupled to the path. In its alternate position it will be so coupled by virtue of the TEM mode of microwave-energy propagation. While signal conductor 16 is shown as a wirelike conductor it should be noted that it is preferable to "print" signal conductor 16 directly on ferrite element 14. Printing is used in its generic sense to include evaporating, sputtering, photoetching or other techniques well known in the arts of printed circuitry and microelectronic fabrication. Similarly, it may be desirable to print ground-plane element 12 on ferrite element 14. The phase-shifting device 10 is provided: with a pair of input terminals I1, connected to one end of signal conductor 16, and I2, connected to one end of ground-plane element 12 for receiving microwave energy; and with a pair of output terminals O1, connected to the other end of signal conductor 16, and O2, connected to the other end of ground-plane element 12. Thus, microwave energy received at the input terminals I1 and I2 will be transmitted from output terminals O1 and O2 delayed or shifted in phase. Note that under any circumstances there will be a delay or phase-shift by virtue of the mechanical path length between the input and output terminals. In addition, here will be a differential delay or phase-shift depending on the direction of remanent magnetization in the plane of ferrite element 14. If the remanent magnetization is transverse to the direction of microwave-energy flow, i.e., perpendicular to signal conductor 16, there is little or no differential phase-shift. If the remanent magnetization is longitudinal to the direction of microwave-energy flow, i.e., parallel to signal conductor 16, in either direction, there is a differential phase-shift. Note that since the same differential phase-shift will occur regardless of the sense of the magnetization with respect to microwave-energy flow as long as the direction of magnetization and the direction of energy flow are parallel, the input and output terminals can be exchanged. Therefore, the device is a reciprocal phase-shifter.

The simplest way of obtaining the orthogonal switching of the remanent magnetization is by energizing two orthogonally disposed control conductors 18 and 20. Preferably, control conductor 18 is insulatively positioned against the bottom face of ground-plane element 12. That face may be covered with a layer of insulation 22 and conductor 18 is printed thereon. Control conductor 20 is similarly printed making sure that at the "crossover" of the two coinductors 18 and 20 they are mutually insulated. In this arrangement of the control conductors it should be realized that the magnetic shielding introduced by ground-plane element 12 must not adversely interfere with the establishment of magnetic fields in the ferrite element 14 by the control conductors 18 and 20. Therefore, the ground-plane element is preferably made of aluminum or copper of minimum thickness.

Each of the control conductors 18 and 20 are provided with terminals for receiving control pulses. Control conductor 18 has terminals C1A and C1B; and control conductor 20 has terminals C2A and C2B.

A maximum differential phase-shift is obtained when the remanent magnetization is orthogonally switched between directions that are longitudinal and transverse to the flow of microwave energy. However, less than this maximum can be obtained by switching between two non-colinear directions when it is realized the remanent magnetization is a vector quantity which can be resolved into components longitudinal and transverse to the flow of microwave energy. Although such an arrangement is less efficient it comes within the scope of the invention.

Figure 2:
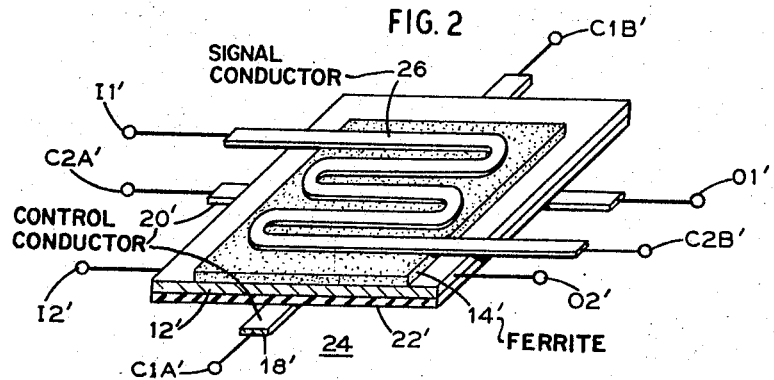
FIGURE 2 is a perspective view of another embodiment of the phase-shifter of FIGURE 1 wherein the signal conductor is convoluted to increase the microwave-energy path.

In order to obtain greater differential phase-shifts for a given ferrite element, the embodiment of FIG. 2 can be employed. Since the phase-shifting device 24 of FIG. 2 is substantially similar to phase-shifting device 10 of FIG. 1, primed reference characters will be used for like elements and only the differences will be noted. The only difference is in the shape of signal conductor 26. Conductor 26 traces out a plurality of convolutions merely to increase the mechanical length of the microwave-energy path. The convolutions should either not be an odd multiple of quarter operating wavelengths long or not be so closely spaced so that their RF-magnetic-field components of the microwave energy interact in the ferrite material to generate a circularly polarized magnetic field if reciprocal differential phase-shifting is desired.

Figure 3:
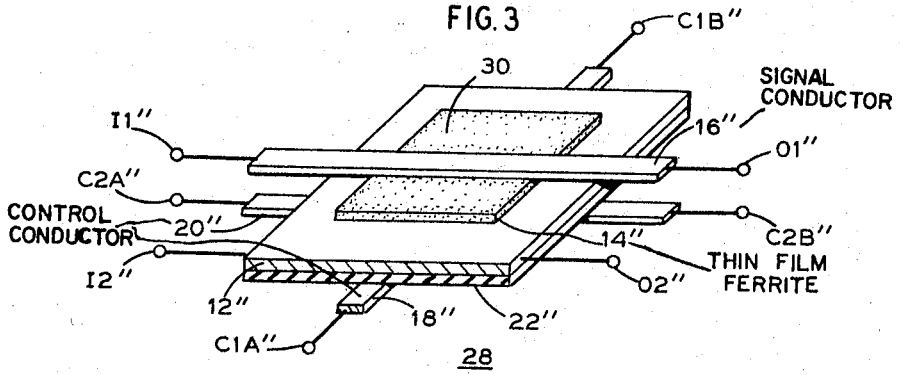
FIGURE 3 is a perspective view of another embodiment of the phase-shifter wherein the ferrite element is a thin film of ferrite material.

The phase-shifting device 28 of FIGURE 3 is similar to phase-shifting devices 10 and 24 except that ferrite element 30 is a thin film of ferrite material printed on ground-plane element 12″. Of course, it may be necessary to employ a dielectric layer to insulate signal conductor 16″ from ground-plane element 12″. Double-primed reference characters are utilized to indicate the similarity of the components.

Figure 4:
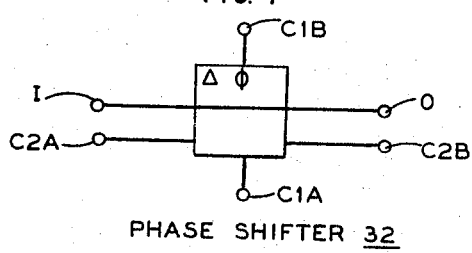
FIGURE 4 is a symbolic representation of the phase-shifters of FIGURES 1 to 3.

There will now be described two important systems applications of the phase-shifting devices. However, to simplify the description, the block diagram symbol of FIG. 4 will be used. Phase-shifting device 32 is any one of the previously described devices 10, 24 or 28. The input terminal I represents the two input terminals I1 and I2. This is done as a matter of convenience since most microwave devices are "two-wire" systems wherein one of the "wires" is a ground, for example a coaxial line. Similarly, the terminal O represents the output terminals O1 and O2. The terminals of the control conductors are the same as described above and carry the same reference characters. Furthermore, for these applications the phase-shifter need not be a reciprocal phase-shifting device but could just as well be a nonreciprocal phase-shifting device as shown and described in the copending application for Nonreciprocal Microwave Devices, Ser. No. 561,792, filed on even date and assigned to the same assignee. In FIGURE 3 of said copending application, terminals TS1 and TS2 are the input terminal I, terminals TS2 and TG2 are the output terminal O, and terminals TC1 and TC2 receive the control signals which shift the phase.

Figure 5:
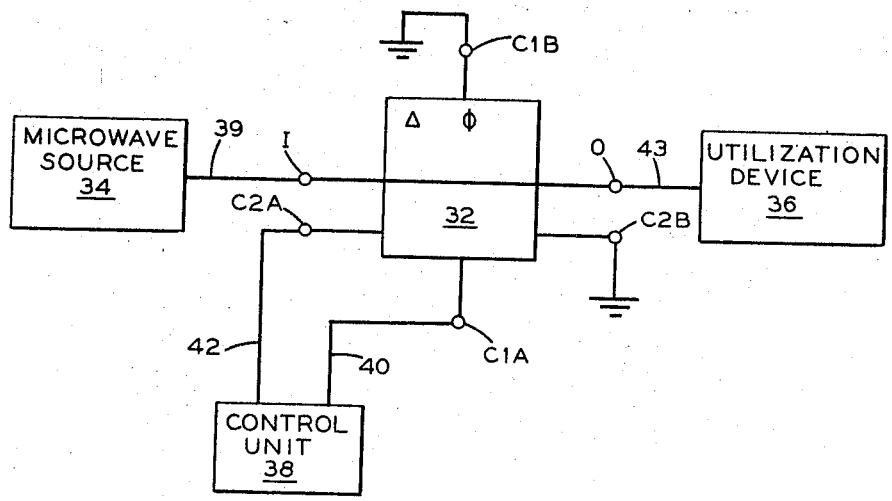
FIGURE 5 is a block diagram of a microwave processing system utilizing the phase-shifters of FIGURES 1 to 3.

The system of FIGURE 5 comprises a microwave source 34 which can be a microwave generator, a phase-shifter, a hybrid-junction, etc., which is coupled, via phase-shifting device 32, to utilization device 36, which may be a microwave radiator, antenna, another phase-shifting device, a hybrid-junction, etc. Microwave source 34 is connected to phase-shifting device 32 by line 39 which may be a coaxial cable, a microstrip line or the like. Similarly, phase-shifting device 32 is coupled to utilization device 36 by line 43. Control unit 38 selectively transmits current pulses via lines 40 and 42 to control terminals C1A and C2A of device 32. After a current pulse is transmitted on line 42 no differential phase-shift is introduced in the microwave energy flowing from input terminal I to output terminal O. After a current pulse is transmitted on line 40 a differential phase-shift is introduced in the microwave energy flowing from input terminal I to output terminal O. When a nonreciprocal phase-shifting device is used, control unit 38 can feed pulse signals in push-pull via lines 40 and 42 to the control input terminals of the device.

Figure 6:
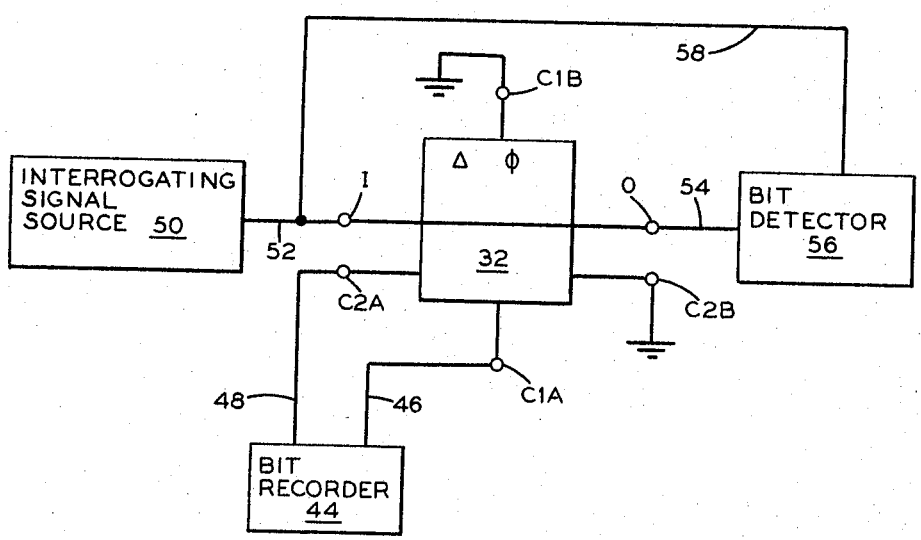
FIGURE 6 is a block diagram of a nondestructive-read-out microwave memory system utilizing the phase-shifters of FIGURES 1 to 3.

In FIG. 6 there is shown the basic elements of a memory system capable of storing one bit of information. Information is represented in phase-script, i.e., a binary one is represented as a microwave-carrier signal having 0° phase difference with respect to a reference phase and a binary zero is represented as a microwave-carrier signal having a 180° phase difference with respect to the reference phase.

The bit-storage element is phase-shifting device 32. An information bit is recorded therein by bit-recorder 44. When bit-recorder 44 transmits a pulse via line 48 to control input terminal C2A, a binary one is stored in device 32; and when bit-recorder 44 transmits a pulse via line 46 to control input terminal C1A, a binary zero is stored in device 32. When a nonreciprocal phase-shifting device is used, bit recorder 44 is connected via the lines 46 and 48 to the two control input terminals of the device. Bit recorder 44 can transmit a push-pull pulse signal to record the bit to be stored.

In order to read from device 32 interrogating signal source 50 transmits microwave energy of a predetermined phase (the interrogating signal) via transmission line 52 to input terminal I. The microwave energy passes through device 32, via output terminal O and transmission line 54 to bit-detector 56. Bit-detector 56 "compares" the phase of the received microwave energy with a reference phase to indicate the value of the stored bit. Bit-detector 56 can take many forms such as a majority-logic element sensitive to phase-script information. However, for the sake of concreteness bit-detector 56 is shown as a phase-detector which compares the phase of the microwave energy received from device 32 with the phase of the microwave energy generated by source 50 and fed via line 58 to detector 56. Of course, it should be realized that the length of the paths via line 58 and via phase-shifting device 32 should be equal or differ by an integral number of operating wave-lengths when device 32 introduces no differential phase shift.

Transmission lines 52, 54 and 58 can be coaxial cables, strip lines or microstrip lines. Interrogation signal source 50 can be a microwave generator, a phase-script-sensitive majority-logic device, etc.

It should be noted that not only can interrogation be performed in the nano-second range but also interrogation does not affect the state of remanent magnetization in the device 32. Therefore, the system permits the nondestructive read-out of information.

There has thus been shown an improved microwave reciprocal phase-shifting device which is very fast in operation and extremely small in size. For example, in a working embodiment of the invention, the ferrite element had a length of 0.5 inch, a width of 0.5 inch, and a thickness of 0.001 inch. The device could be switched in 10 nano-seconds by a power of 20 nano-joules. The device can introduce a 160 degree differential phase-shift in a microwave signal having an operating frequency of 2.2 gHz. with an attenuation of only 2.0 db. The ferrite employed was a TTI-414 having a coercivity of 0.7 oe. and a saturation magnetization of 700 gauss.

Since the device has a planar configuration it readily lends itself to batch fabrication using well known printed circuitry or microelectronic techniques.

By virtue of the small size and simplicity of the device it is readily incorporated in multielement microwave systems and data processing systems. In particular, it is ideally suited for use in a content-addressable or associative memory because of its speed of operation and because stored information can be nondestructively read.

There will now be obvious to those skilled in the art many modifications and variations which satisfy many or all of the objects and to which accrue the advantages of the invention but which do not depart from the spirit thereof as defined by the appended claims.

What is claimed is:

1. A reciprocal phase-shifting device comprising at least one planar ground-plane element, a signal conductor disposed in a plane parallel to the plane of said ground-plane element, said signal conductor and said ground-plane element being spaced from each other in cooperating relation to provide a guided-microwave-energy path, a planar self-latching-ferrite element disposed parallel to the plane of said ground-plane element and in electromagnetic cooperation with the guided-microwave-energy path, switching means for selectively switching the remanent magnetization of said ferrite element between substantially orthogonal directions in the plane thereof, microwave-energy input means disposed at one end of said signal conductor and said ground-plane element, and microwave-energy output means disposed at the other end of said signal conductor and said ground-plane element.

2. The reciprocal phase-shifting device of claim 1 wherein said signal conductor is formed in a plurality of convolutions to increase the length of the guided-microwave-energy path.

3. The reciprocal phase-shifting device of claim 1 wherein said switching means switches the remanent magnetization of the ferrite element between directions that are longitudinal and transverse to the guided-microwave-energy path.

4. The reciprocal phase-shifting device of claim 1 wherein said ferrite element is disposed between said ground-plane element and said signal conductor.

5. The reciprocal phase-shifting device of claim 4 wherein said ferrite element is disposed on said ground-plane element and said signal conductor is printed on said ferrite element.

6. The reciprocal phase-shifting device of claim 5 wherein said ferrite element is a film of ferrite material printed on said ground-plane element.

7. The reciprocal phase-shifting device of claim 1 wherein said switching means comprises control conductor means planarly disposed parallel to the plane of said ferrite element.

8. The reciprocal phase-shifting device of claim 7 wherein said control conductor means comprises first and second substantially orthogonally disposed control conductors.

9. The reciprocal phase-shifting device of claim 8 wherein one of said control conductors is insulatively fixed to the side of said ground-plane element remote from said signal conductor and aligned longitudinal to the guided-microwave-energy path, and the other of said control conductors is insulatively fixed to the side of said ground-plane element remote from said signal conductor and aligned transverse to the guided-microwave-energy path, said control conductors being insulated from each other.

10. The reciprocal phase-shifting device of claim 9 wherein said ferrite element is a thin film of ferrite material printed on one side of said ground-plane element and said first and second control conductors are printed on the other side of said ground-plane element.

11. A reciprocal phase-shifting microwave system comprising a source of microwave energy, at least one planar ground-plane element, a signal conductor disposed in a plane parallel to said ground-plane element, said signal conductor and said ground-plane element cooperating to provide a guided-microwave-energy path, a planar self-latching-ferrite element disposed in a plane parallel to the plane of said ground-plane element and in electromagnetic proximity with said signal conductor, switching means for selectively switching the remanent magnetization of said ferrite element between substantially orthogonal directions in the plane thereof, means for connecting said source of microwave energy to one end of said signal conductor, a microwave-energy utilization device, and means for connecting said microwave-energy utilization device to the other end of said signal conductor.

12. A microwave device comprising at least one planar ground-plane element, a planar self-latching-ferrite element disposed in a plane parallel to and on one side of said ground-plane element, a signal conductor printed on said ferrite element, and at least one control conductor insulatively disposed on the other side of said ground-plane element.

13. A microwave device comprising, as a laminar structure, at least one planar ground-plane element, a signal conductor disposed in a plane parallel to said ground-plane element, said signal conductor and said ground-plane element being spaced from each other in cooperating relation to provide a guided-microwave-energy path, a planar self-latching-ferrite element disposed in a plane parallel to the plane of said ground-plane element and in electromagnetic cooperation with the guided-microwave-energy path, and control means including angularly and non-colinearly disposed selectively and individually energizable control conductors for switching the remanent magnetization of said planar self-latching-ferrite element between preselected directions, said control conductors being disposed in a plane parallel to said ground-plane element and external to said planar self-latching-ferrite element.

14. The microwave device of claim 13 wherein said ferrite element is disposed on one side of said ground-plane element and said signal conductor is printed on said ferrite element.

15. The microwave device of claim 14 wherein said ferrite element is a film of ferrite material printed on said ground-plane element.

16. A nondestructive-read-out microwave memory system comprising: at least one bit-storage element, said bit-storage element comprising at least one planar ground-plane element, an interrogating-signal conductor disposed in a plane parallel to said ground-plane element, said ground-plane element and said interrogating-signal conductor cooperating to provide a guided-microwave-energy path, a planar self-latching-ferrite element disposed in a plane parallel to the plane of said ground-plane element and in electromagnetic proximity with said interrogating-signal conductor; bit-recording means for controllably setting the remanent magnetization in said ferrite element in a first direction for recording a first bit-value and in a second direction for recording a second bit-value; a microwave-interrogating-signal generating means connected to one end of said interrogating-signal conductor and said ground-plane element for transmitting microwave signals along said guided microwave-energy path; the microwave-interrogating signal being differentially shifted between first and second phases in accordance with the direction of remanent magnetization in said ferrite element; and means connected to the other end of said interrogating-signal conductor and said ground-plane element for indicating the value of the bit stored in said bit-storage element in accordance with the phase of the microwave signal transmitted from said other end of said interrogating-signal conductor.

17. The memory system of claim 16 wherein said ferrite element is disposed on said ground-plane element and said interrogating-signal conductor is printed on said ferrite element.

18. The memory system of claim 17 wherein said ferrite element is a thin film of ferrite material printed on one side of said ground-plane element.

19. The memory system of claim 17 wherein said bit-recording means includes at least one conductor insulatively disposed on the other side of said ground-plane element.

References Cited
UNITED STATES PATENTS

| | | | |
|---|---|---|---|
| 3,257,629 | 6/1966 | Kornreich | 333—31 |
| 3,277,401 | 10/1966 | Stern | 333—24.1 |
| 3,289,115 | 11/1966 | Carr | 333—31 |
| 3,341,789 | 9/1967 | Goodman et al. | 333—1.1 |
| 3,350,663 | 10/1967 | Siekanowicz et al. | 333—1.1 |

ELI LIEBERMAN, *Primary Examiner.*

PAUL L. GENSLER, *Assistant Examiner.*

U.S. Cl. X.R.

333—24.1, 31, 84